Sept. 21, 1937.　　　　W. BÖHLER　　　　2,093,542
JACK FOR MOTOR VEHICLES
Filed March 5, 1936
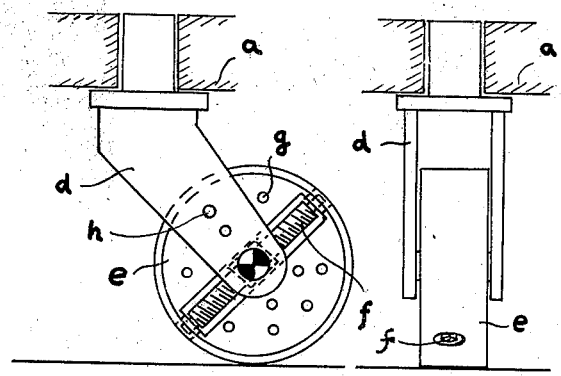
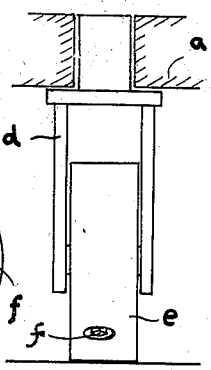
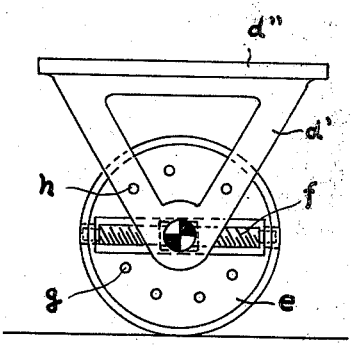
Inventor:
Wilhelm Böhler

UNITED STATES PATENT OFFICE 2,093,542

JACK FOR MOTOR VEHICLES

Wilhelm Böhler, Frankfort-on-the-Main, Germany

Application March 5, 1936, Serial No. 67,415
In Germany December 14, 1935

1 Claim. (Cl. 254—94)

This invention relates to a jack for motor vehicles.

One object of the invention is to provide a jack capable of lifting a vehicle by utilizing the travelling motion thereof.

A further object is to provide a jack that can be used as emergency wheel.

The invention attains its objects by the improvement described below and recited in the claim.

By way of example, the invention is illustrated in the accompanying drawing, in which Figure 1 is a side view of the jack; Fig. 2, a front view thereof; and Fig. 3, a side view of a jack provided with a platform.

Referring to the drawing, the jack comprises a disc-like roll $e$ the axis of which can be radially displaced by means of a screw $f$ rotatably disposed within the roll $e$ so as to permit concentric and eccentric adjustment of the axis of the roll. The axis is arranged in a fork $d$ which may be swingingly or adjustably arranged on the chassis $a$. The roll $e$ may also be provided with a platform $d''$, in which case the fork $d'$ is double-armed.

If for example the vehicle is to be lifted, a pivot provided on the fork $d$ is inserted in a clearance of the chassis $a$, and the screw $f$ is then turned by means of a wrench until the axis of the roll $e$ has the desired degree of eccentricity, i. e., the axis is moved out of the center of the roll $e$. Then the smallest distance between the axis and the edge of the roll $e$ is adjusted between the ground and the axis, whereupon the vehicle is started slowly to cause rotation of the roll $e$. As the latter is eccentrically adjusted, the sliding of the circumference of the disc-like roll on the ground will effect lifting of the vehicle. To prevent further motion of the roll $e$ a pin is inserted in bores $h$ of the fork $d$ and bores $g$ in the roll $e$ to arrest the motion of the roll.

According to Fig. 3, the platform $d''$ is placed on the road, the roll $e$ brought into eccentric position by means of the screw $f$ and the entire device pushed under the vehicle to such an extent that the roll $e$ finds a working surface, such as the chassis of the vehicle. When the vehicle moves, the platform adheres to the road whilst the eccentrically moving roll $e$ lifts the vehicle.

After the axis has been placed again in the center of the roll $e$ by means of the screw $f$ the roll $e$ moves concentrically and the jack can serve as emergency wheel on the chassis.

I claim:—

Jack for lifting motor vehicles by utilizing the travelling motion thereof, comprising a fork, a disc-like roll rotatably and fixably arranged in said fork and a screw disposed in the plane of the disc-like roll for radially displacing the axis thereof, said roll being adapted to serve as emergency wheel at centric adjustment of the axis of the roll.

WILHELM BÖHLER.